May 1, 1962 G. CHIEGER 3,032,646
TRAILER CLEARANCE AND MARKER LIGHT
Filed May 11, 1959
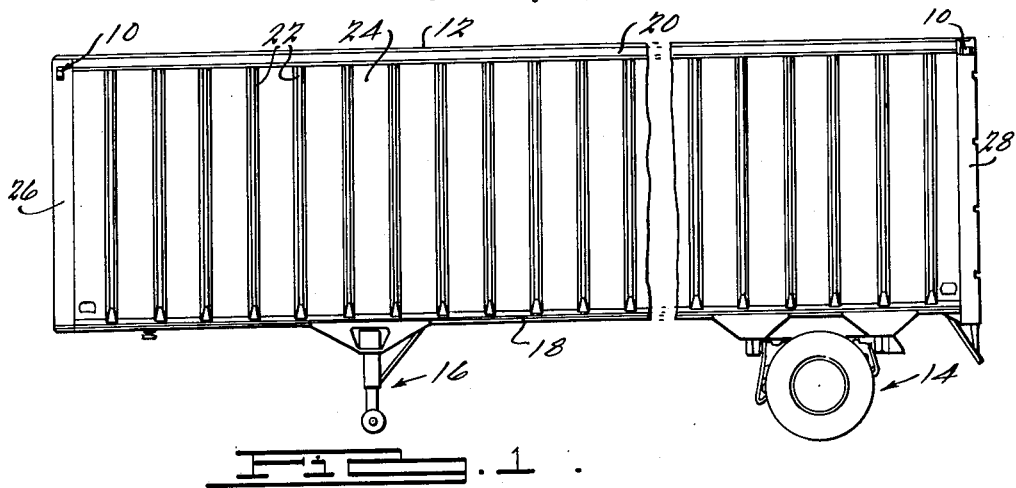
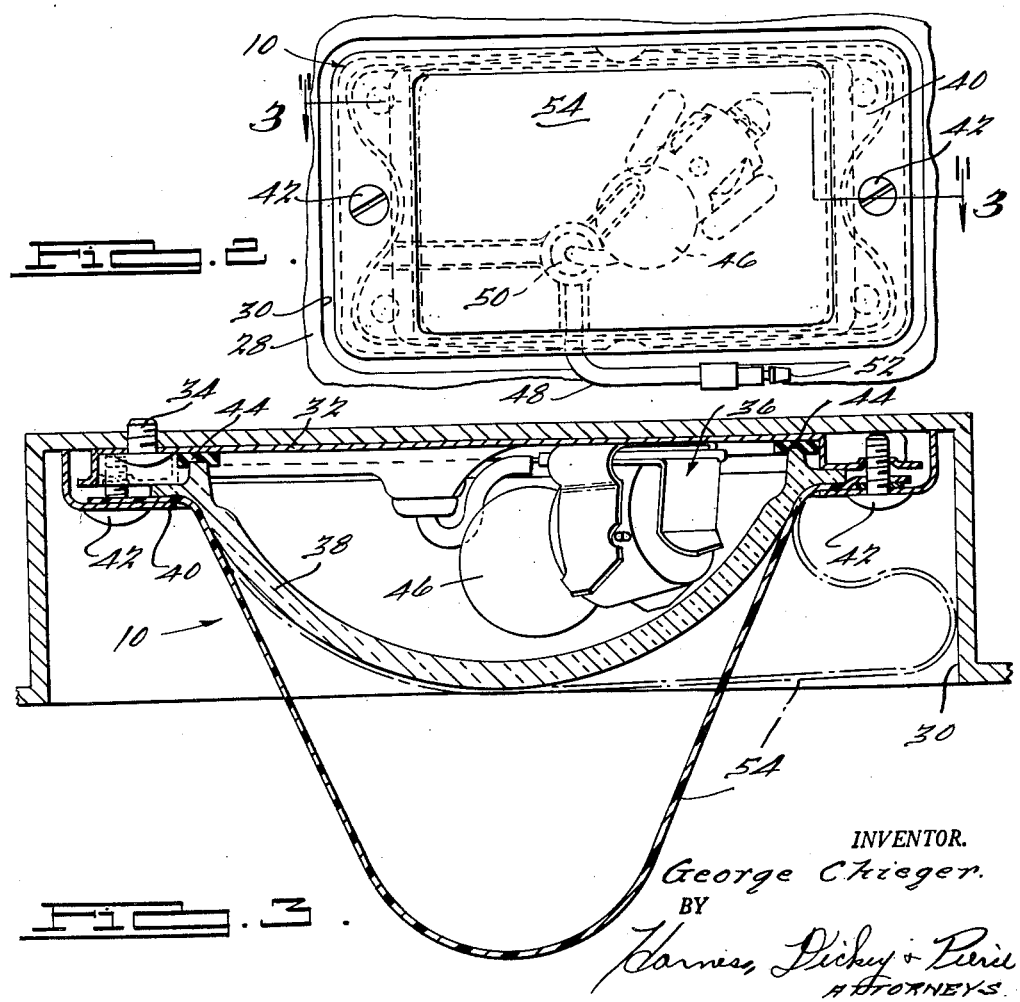
INVENTOR.
George Chieger.
BY
Harness, Dickey & Pierce
ATTORNEYS.

3,032,646
TRAILER CLEARANCE AND MARKER LIGHT

George Chieger, Grosse Pointe Woods, Mich., assignor to Fruehauf Trailer Company, Detroit, Mich., a corporation of Michigan
Filed May 11, 1959, Ser. No. 812,364
5 Claims. (Cl. 240—8.2)

This invention relates to new and useful improvements in trailer clearance and marker lights.

Trailers are required by law to have lights at specified locations. For example, clearance lights usually are provided at the upper front corners of the trailer and marker lights are provided along the sides of the trailer usually at the corners.

The dimensions of the trailer with respect to both length and width also are limited and the measurements are taken to the outermost fixed parts thereof. Thus, if the marker lights for example, extend outwardly from the trailer wall and beyond any other part of the trailer, the width of the trailer is the distance between the outermost surfaces of the marker lights. This in turn means that the body of the trailer is narrower than the maximum permissible width by the amount the lights extend beyond the sides of the trailer and the capacity of the trailer body is reduced by that amount.

As a result, it is the practice to set the trailer lights into recesses in the wall or frame of the trailer body. However, the lights obviously cannot be so deeply recessed that they are not readily visible. Marker lights, for example, should be visible not only from the side of the trailer but also from the front as the driver uses these lights in maneuvering the trailer and in determining its position.

Inasmuch as the dimensions of the trailer are taken only to fixed parts thereof, it has been proposed heretofore to pivotally mount the lights so that they normally project laterally from the trailer sufficiently to be clearly visible but rock back into recesses in the trailer wall in the event they strike an obstruction. This type of mounting has the disadvantage that the electrical connections to the lights must pass through the pivot mountings and the relative movement between the movable and fixed parts of the mountings sometimes adversely affect the connection. In addition, this type of mounting has the disadvantage that the pockets in which the lights are mounted sometimes fill with ice and snow or with dirt which prevents the lights from pivoting and results in the lights being broken when struck by an obstruction.

An important object of the present invention is to provide a trailer light of the above mentioned character that can be recessed into the wall of the trailer so as not to reduce the capacity of the trailer body.

Another object of the invention is to provide a trailer light of the above type having a part that projects laterally of the trailer body and is readily visible from the front as well as the side of the trailer.

Still another object of the invention is to provide a trailer light in which the visible projecting portion is flexible and resilient and that will not be broken or damaged by ordinary abuse in use.

Other objects and advantages of the invention will be apparent during the course of the following description:

In the drawing forming a part of this specification and wherein like numerals are employed to designate like parts throughout the same;

FIGURE 1 is a side elevational view of a conventional van-type trailer having marker lights on the side thereof, FIG. 2 is an enlarged, fragmentary, front elevational view of one of the trailer marker lights, and FIG. 3 is an enlarged, longitudinal sectional view taken on the line 3—3 of FIG. 2.

In the drawing, wherein for the purpose of illustration is shown a preferred embodiment of the invention, reference is first had to FIGURE 1 which shows a conventional van-type trailer of a type normally equipped with clearance and marker lights. The trailer is here shown in side elevation and marker lights 10 are provided at the upper corners of the trailer side wall according to conventional practice. The particular trailer here shown by way of illustration has a body 12 supported at the rearward end thereof on a conventional wheel suspension 14 and adapted to be supported at the forward end thereof by a conventional landing gear 16. The side wall of the particular body 12 here shown has horizontal floor and roof rails 18 and 20 interconnected by vertical frame members or posts 22. Side or skin panels 24 are riveted or otherwise secured to the posts 22 at the inner sides thereof to provide a smooth inner wall for the trailer. Corner posts 26 and 28 are provided at the front and rear respectively of the trailer side wall. A socket or pocket 30 is provided at the top of each corner post to receive a marker light 10 as shown.

A single marker light is shown in detail in FIGS. 2 and 3. This light comprises a plate 32 mounted on the bottom of the pocket 30 and fastened to the post by screws 34. A conventional light socket assembly 36 is fastened in any suitable manner on the mounting plate 32, and a cupped lens 38 of glass or plastic and covering the light socket 36 is fastened to the mounting plate by a lens ring 40 and screws 42. As perhaps best shown in FIG. 3, a sealing gasket 44 is provided between the mounting plate 32 and the lens 38 to assure a relatively tight moisture proof enclosure within the lens. Mounted in the socket 36 is a bulb 46, and either the bulb or the lens 38 or both may be suitably colored in accordance with the exigencies of the particular situation. An electrical conductor 48 extends from the socket assembly 36 through a sealed connection 50, and a conventional terminal 52 is provided on the end of the conductor for connection with the electrical system or harness of the trailer.

As shown in FIG. 3, the entire light assembly thus far described is contained entirely within the pocket 30. When the bulb 46 is lit it is clearly visible from the side of the trailer but is cannot be readily seen, if it can be seen at all, from directly in front or in back of the trailer. Thus, it is difficult for the driver of a tractor to which the trailer is attached to see the side marker lights in his rearview mirrow and as a consequence it may be difficult or impossible for him to locate accurately in the dark the ends of the trailer.

In order to render the marker lights more clearly visible from the ends of the trailer and particularly from the cab of a tractor towing the trailer, a flexible and resilient translucent strip 54 of a suitable sheet or strip material such as nylon or the like is mounted at the outer side of the lens 38. The ends of the strip 54 conveniently can be inserted under the lens ring 40 and fastened by the screws 42. When thus secured, the strip 54 is arched as shown in FIG. 3 with the apex thereof spaced from the lens 38 and the strip itself extends substantially laterally outwardly from the corner post and in fact from the entire side wall of the trailer.

Light from the bulb 46 illuminates the strip 54 and inasmuch as the latter extends substantially outwardly from the side of the trailer it is clearly visible from the ends of the trailer. By reason of the flexible yieldable nature of the strip 54, it does not limit the permissible width of the trailer and if it is hit by an obstruction it is readily deformable and will be pushed back into the pocket 30 as shown by broken lines in FIG. 3. Furthermore, by reason of the resilient nature of the strip 54 it will assume its normal projecting position as soon as it is released by the obstruction. In this connection it will be observed that the strip 54 when in the collapsed or folded position can be contained entirely within the pocket 30. The nylon material preferably used for the strip 54 is relatively unaffected by normal variations in temperature and is not readily damaged by conditions and abuse to which it normally is subjected in use.

It may thus be seen that I have accomplished the objects of my invention. I have provided a trailer light assembly wherein the fixed rigid parts are contained entirely within the confines of the trailer side wall so as not to limit the permissible dimensions of the trailer or to restrict the capacity of the trailer body. Parts of the assembly, however, that do not restrict the dimensions of the trailer project laterally to render the light visible. At the same time, the projecting member is yieldable so that it cannot be easily torn or broken. By reason of the fact that the projecting member is readily deformable it can, if necessary, be contained entirely within the confines of the pocket in which the light is mounted. Also, all parts of the light assembly affecting the connection with the electrical harness of the trailer are fixed so that they are unaffected by any object striking the projecting strip 54.

What is claimed is:

1. In combination with a trailer marker or clearance light of the type having a mounting plate, a bulb and socket assembly on said mounting plate, and a lens on said mounting plate covering said light and socket assembly, the improvement comprising an arched translucent flexible and resilient strip superimposed on and extending at its apex substantially beyond said lens, and means fastening the ends of said strip in fixed spaced relation so that the arched middle portion of the strip normally is spaced a substantial distance beyond said lens, said strip adapted to yield when engaged by an obstruction and to assume its normal projecting position when released by the obstruction.

2. A trailer having a vertical body wall provided with a marker or clearance light having a fixed lens, a lens-ring surrounding and overlapping the marginal edge portion of said lens, and a translucent strip disposed at the outer side of said lens with the ends thereof extending under and clamped between the lens and said lens ring, the middle portion of said strip being arched away and spaced a substantial distance from the lens and extending substantially outwardly beyond said trailer wall, whereby said strip is illuminated by the light and normally is clearly visible at the side of the trailer, said strip being yieldable and deformable and adapted to be flattened against said lens when struck by an obstruction and being resilient so as to resume its normal projecting position when released by the obstruction.

3. A marker or clearance light assembly for trailers and the like comprising light means, a lens covering said light means, a mounting member having a socket receiving and substantialy entirely containing said light means and said lens, an arched strip of translucent plastic material at the outer side of said lens, at least the middle portion of said strip being spaced from said lens and extending a substantial distance out of said socket so as to project laterally outwardly from said mounting member, said strip adapted to be illuminated by said light means so as to render the projecting portion thereof clearly visible, said strip being yieldable and deformable entirely into said socket when struck by an obstruction and being resilient so as to assume its normal projecting position when released by the obstruction.

4. A marker or clearance light for trailers and the like comprising a mounting member having a pocket therein, light means in and substantially entirely contained by said pocket, and an arched strip of tough resilient plastic material at the outer side of said light means, at least the middle portion of said strip being spaced from said light means and extending a substantial distance out of said pocket and laterally of said mounting member, said strip adapted to be illuminated by said light means so as to render the projecting portion thereof visible, said strip further being yieldable and deformable entirely into said pocket when engaged by an obstruction and being resilient so as to assume its normal projecting position when released by the obstruction.

5. In a recessed marker light for a vehicle having a generally planar wall section, the improvement comprising a strip of flexible resilient translucent plastic material having an arched portion intermediate opposite end portions thereof, means for securing one end portion of said strip in fixed relationship with respect to said light with the arched portion of said strip overlying the light so as to be illuminated thereby, the arched portion of said strip projecting through the plane of said wall section to mark the location of the light on the vehicle, said strip being substantially entirely accepted within the recess upon engagement with an obstruction, and said strip being sufficiently resiilent so as to assume said normal arched and projecting position when disengaged from the obstruction.

References Cited in the file of this patent
UNITED STATES PATENTS

| | | |
|---|---|---|
| 1,325,619 | Clemmans | Dec. 23, 1919 |
| 1,968,838 | Lanagan | Aug. 7, 1934 |
| 2,071,100 | Allison et al. | Feb. 16, 1937 |
| 2,325,403 | Illiano | July 23, 1943 |
| 2,713,114 | Boyd | July 12, 1955 |
| 2,719,214 | Potter | Sept. 27, 1955 |
| 2,731,544 | Kayser | Jan. 17, 1956 |
| 2,734,129 | Kahla | Feb. 7, 1956 |
| 2,781,443 | Cargle | Feb. 12, 1957 |

FOREIGN PATENTS

| | | |
|---|---|---|
| 614,630 | Great Britain | Dec. 20, 1948 |